United States Patent Office

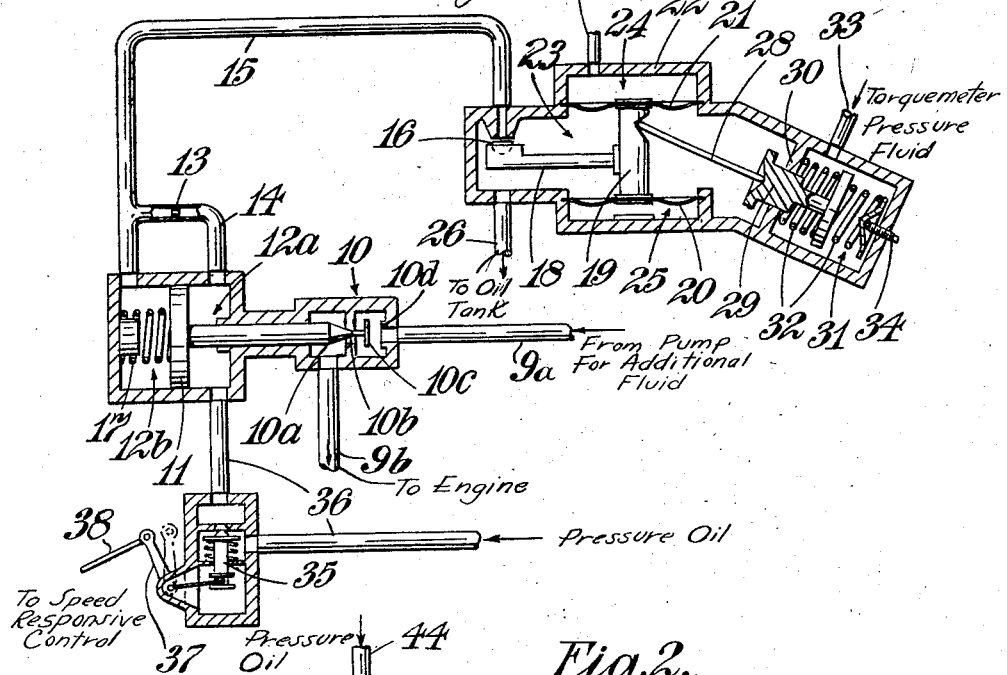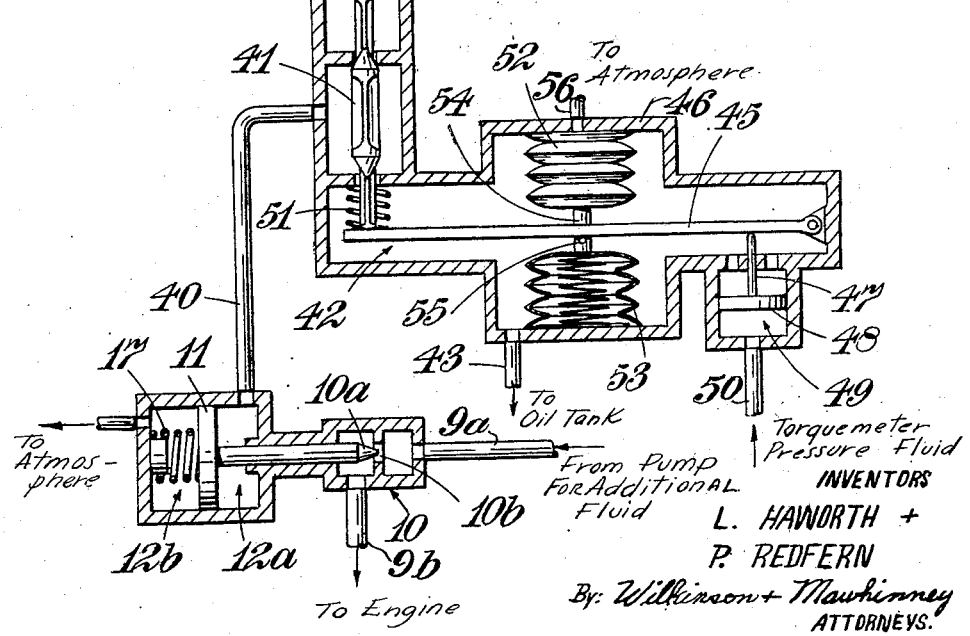

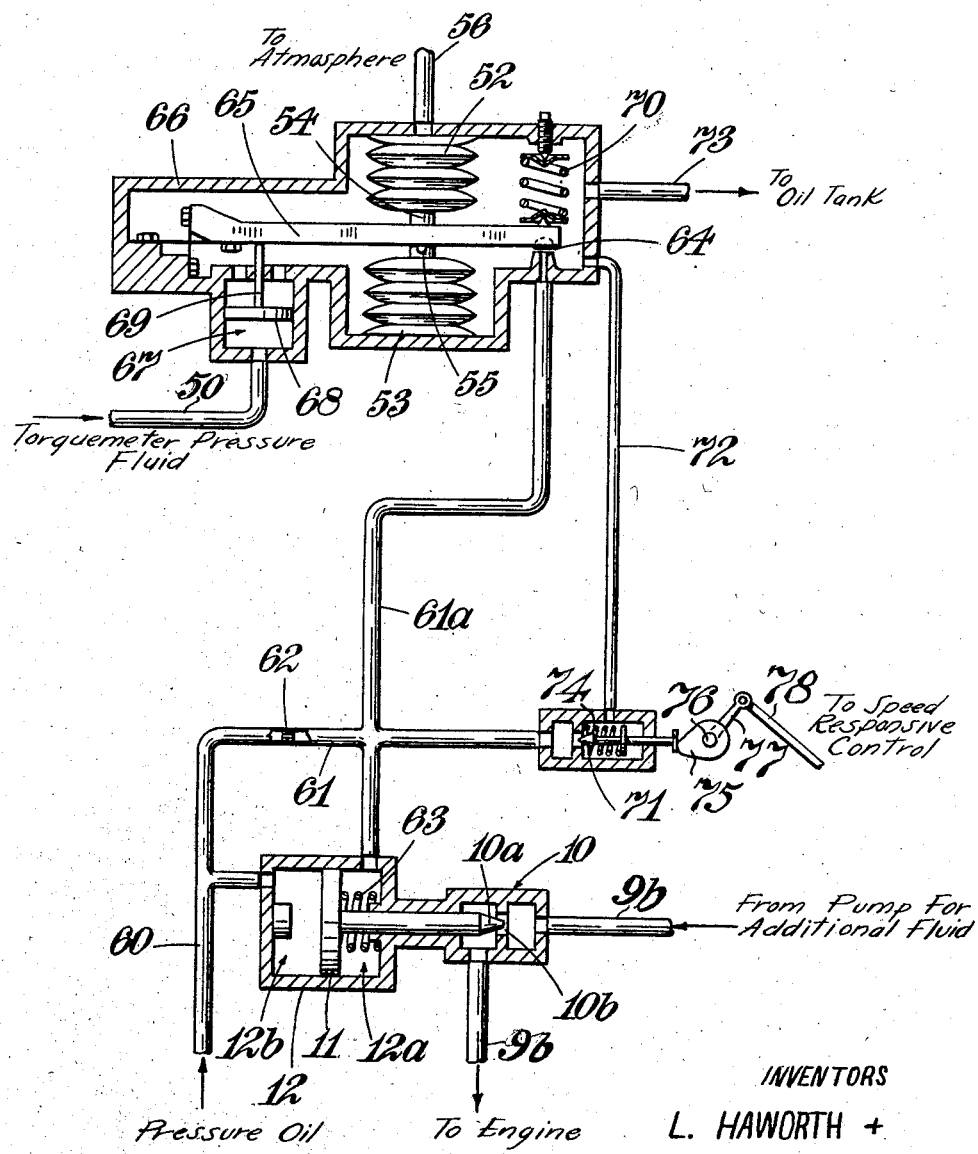

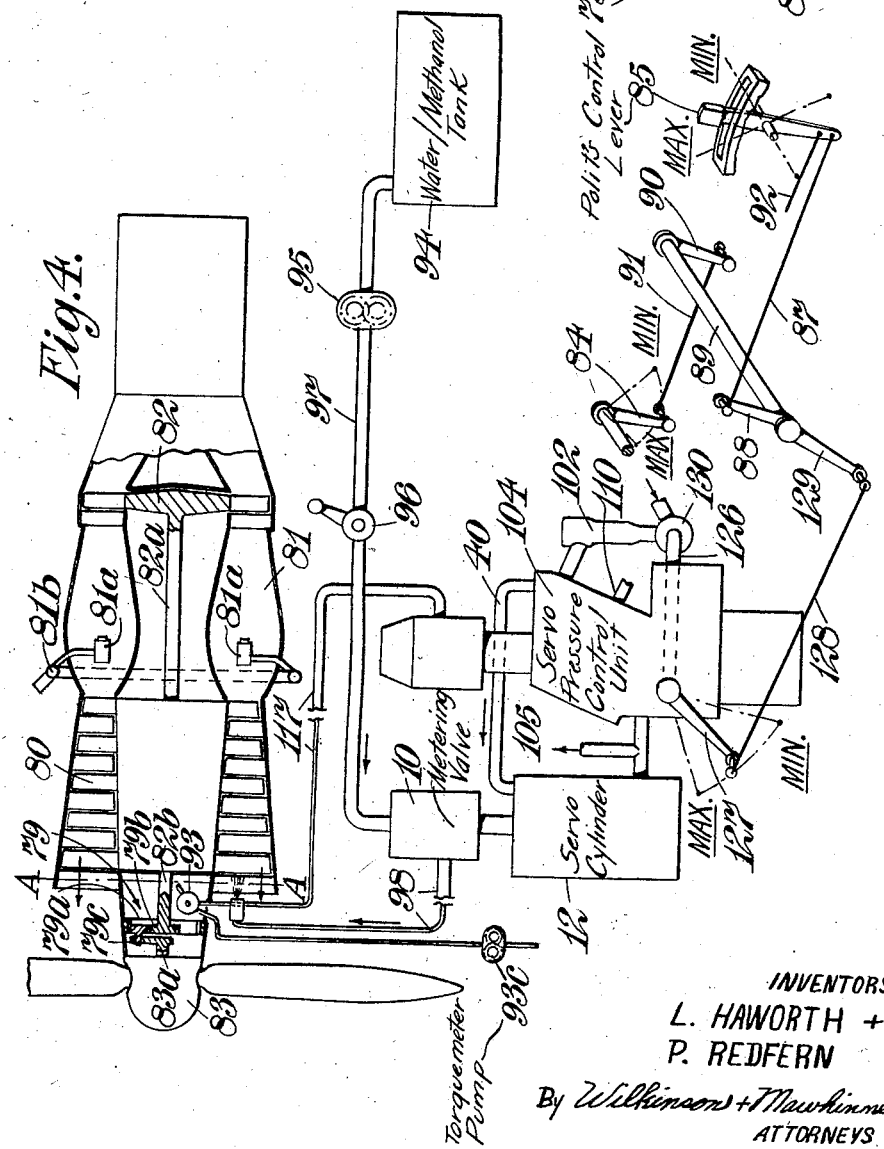

2,795,107
Patented June 11, 1957

---

2,795,107

TORQUE-RESPONSIVE CONTROL SYSTEMS FOR CONTROLLING THE SUPPLY OF FLUIDS TO COMBUSTION ENGINES

Lionel Haworth, Littleover, and Peter Redfern, Derby, England, assignors to Rolls-Royce Limited, Derby, England, a British company Application July 11, 1951, Serial No. 236,098

Claims priority, application Great Britain July 10, 1950

36 Claims. (Cl. 60—39.28)

This invention relates to control systems for controlling the supply of an additional fluid into an internal combustion engine having a power output shaft for the purpose of augmenting the shaft power thereof. It is applicable both to reciprocating internal combustion engines and to gas-turbine engines.

The invention has an important application in internal combustion engines used for aircraft propulsion, and may also be employed in certain cases with engines used for the propulsion of other vehicles, for instance, marine craft, and with engines of stationary power plants.

In such engines it has been proposed, and in certain cases it is the practice to provide, in addition to the normal fuel supply, a supply of additional fluid for the purpose of augmenting the power delivered by the engine. It is known that the power delivered by a gas-turbine engine or by a reciprocating internal combustion engine is affected by variations in atmospheric conditions; for instance, it is known that the power developed by such engines at their maximum rotational speed may be greatly reduced under conditions of high ambient temperature, as compared with the power developed at the ambient temperature for which the engine is designed. This may be particularly important when such engines are installed in aircraft, where it is desirable that the normal maximum power of the engine should be available under high ambient temperature conditions, for example during the take-off of an aircraft in which the engine is installed; additional fluid may be supplied to such an engine to augment the power developed under high ambient temperature conditions, and one object of the present invention is to control the supply of additional fluid in a desirable manner.

The term "additional fluid" as used in this specification includes a fluid which is supplied to the engine for charge cooling purposes or for increasing the mass flow of working medium through the engine, for example by injection of the fluid into the air intake of the engine. Fluids normally used for this purpose include water, a mixture of water and methanol, and in some cases the normal engine fuel, the additional supply of the normal fuel being fed to the engine through auxiliary supply means separate from the main fuel supply means.

A further object of the present invention is to provide means for controlling the supply of additional fluid to an internal combustion engine to compensate for varying atmospheric conditions, for example atmospheric temperature and pressure.

According to this invention, there is provided in or for an engine having a power output shaft and arranged for additional fluid injection, a control system comprising engine-torque-responsive means to control the delivery of the additional fluid to the engine in accordance with the engine torque. Preferably it is arranged that when the torque-responsive control is operative, the flow of additional fluid is controlled to increase as the torque decreases and vice versa whereby the flow is governed in such a manner as to maintain a selected value of the torque.

According to a feature of this invention, it may be arranged that the engine-torque-responsive control means become operative at engine rotational speeds above a selected rotational speed.

According to yet another feature of this invention, the torque-responsive control means may also be made responsive to the actual engine rotational speed or to the speed setting selected by the speed-selecting device of the engine, in the sense that as the actual engine rotational speed or selected speed increases the selected value of the torque which is to be maintained by the control means is also increased. Thus for each value of the engine rotational speed at which the control means are operative there will be a corresponding selected value of the torque, which is maintained by the control means of the invention through the regulation of the supply of additional fluid. It will be clear that for each such value of the engine rotational speed there will consequently be a corresponding value of the horse-power delivered by the engine.

It may be arranged that the selected value of the torque decreases in such a manner on increase of engine rotational speed that the corresponding value of the horse-power is constant. Thus the flow of additional fluid may be controlled in accordance with the engine torque to maintain a selected value of the horse-power.

The control means of this invention may therefore be operative under conditions whereof the ambient temperature is higher than that at which the engine is designed to operate, to control the flow of additional fluid to the engine to maintain the power output of the engine under the higher temperature conditions to be substantially equal to the power output at the temperature for which the engine is designed.

It will be appreciated that the supply of additional fluid to the engine may be controlled so that under high ambient temperature conditions the supply of additional fluid does not result in the development of excessive torque, or horse-power, by the engine, which might result in the overstressing or the over-heating of the parts of the engine.

According to a feature of the invention, a control system for controlling the supply of an additional fluid to an internal combustion engine for the purpose of augmenting the power thereof said engine having a power output shaft may comprise torquemeter means connected to said power output shaft of the kind in which there is generated a fluid pressure which is a function of the torque in said shaft, means for supplying said additional fluid to said engine to augment the power thereof including a conduit through which said additional fluid passes, metering means in said conduit, and a pressure-sensitive device connected to be sensitive to the torquemeter fluid pressure and connected to said metering means and to control the supply of additional fluid to the engine to be dependent on said torque.

According to a further feature of the invention, the metering means may comprise valve means through which said additional fluid passes and a servo mechanism including a piston and cylinder device whereof the piston divides the cylinder into two pressure spaces and is operatively connected to said valve means, a source of servo fluid under pressure and control means to connect said pressure fluid source to one of said pressure spaces, said pressure-sensitive device being connected to be sensitive to said torquemeter fluid pressure and to operate said control means thereby to control said valve means so that the supply of additional fluid to the engine is dependent on said torque.

According to yet another feature of the invention, the engine-torque-responsive means controlling the flow of additional fluid to the engine may also be arranged to be responsive to atmospheric pressure, whereby the supply of fluid is modified in accordance with atmospheric pressure.

Some embodiments of the control of this invention will now be described by way of example, for use in conjunction with a torquemeter of the type in which a fluid pressure is generated which is proportional to the torque developed by the engine, the description referring to the accompanying drawings in which:

Figure 1 illustrates diagrammatically one form of control;

Figure 2 illustrates diagrammatically a second form of control;

Figure 3 illustrates diagrammatically a third form of control;

Figure 4 illustrates diagrammatically an engine arranged for additional fluid injection and having associated with it a torquemeter of the type above referred to and a control system in accordance with this invention;

Figure 4A illustrates diagrammatically the torquemeter and engine and is a cross-sectional view on line A—A of Figure 4 to a larger scale than Figure 4.

Figure 5:
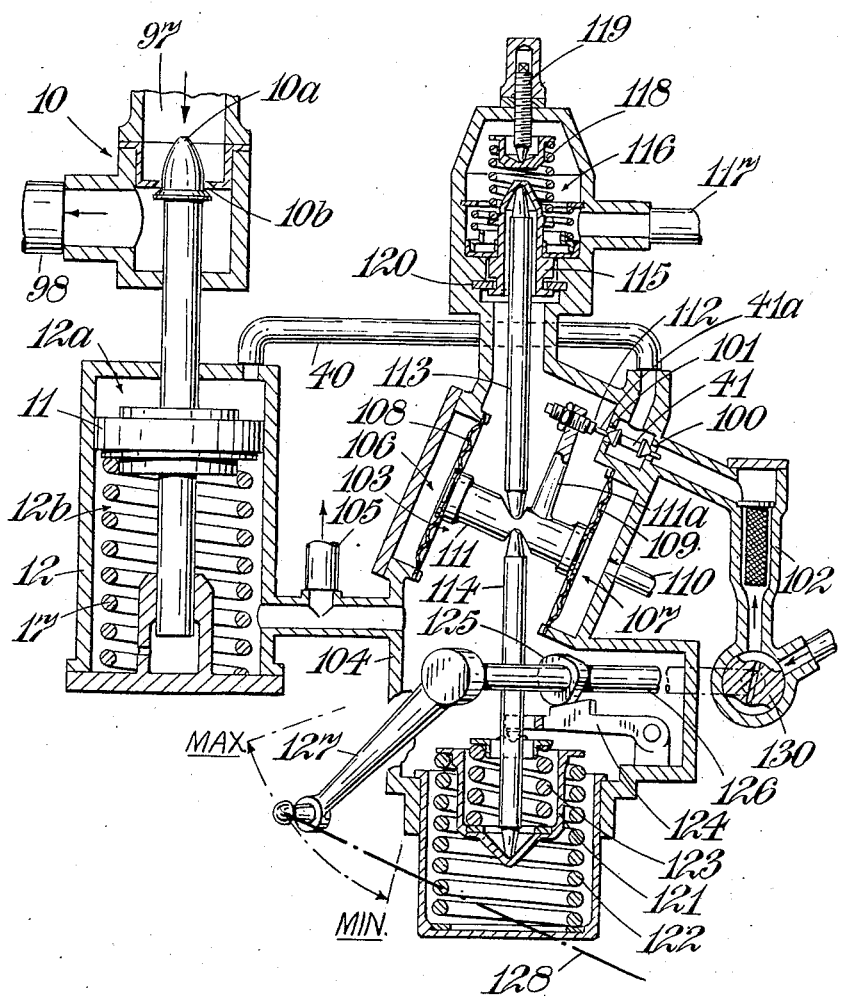
Figure 5 illustrates diagrammatically but in greater detail the control employed in Figure 4.

In the embodiment illustrated in Figure 1, a supply of additional fluid is led from a suitable form of pump (not shown) by way of pipe 9a, a metering valve 10 and pipe 9b, to the engine, the metering valve comprising a valve member 10a and a co-operating orifice 10b. The valve member 10a is adjusted by a servo-piston 11 arranged to move in a cylinder 12. A supply of servo fluid (oil under pressure) is fed to the cylinder space 12a on the side of the piston 11 nearest the valve member 10a, and cylinder space 12b on the other side of the piston 11 is connected to the space 12a through a flow restrictor 13 in a conduit 14, and has connected to it a bleed conduit 15 the outflow through which is controlled by a bleed valve 16. A compression spring 17 is accommodated in the space 12b to load the piston 11 in the sense of displacing valve member 10a to reduce the effective area of the metering valve orifice 10b.

The obturating member of the bleed valve 16 is in the form of a half ball and the half ball is carried on the free end of an arm 18 extending laterally from a cylindrical pillar 19 which is attached at its ends to spaced flexible metal diaphragms 20, 21, which are supported in a cylindrical casing 22 to divide it into three spaces 23, 24, 25. The space 23 between the diaphragms 20, 21 is connected by pipe 26 to the sump for the servo oil which has passed through the bleed valve 16. The space 24 above the diaphragm 21 is open through pipe 27 to atmosphere so that the pressure therein is the ambient barometric pressure, and the space 25 below the diaphragm 20 is evacuated.

The pillar 19 is acted upon by an inclined push rod 28 so as to cause movement of the pillar 19 along its axis, and this movement controls the opening of the bleed valve 16. Movement of the pillar 19 at right angles to its axis is resisted by the stiffness of the diaphragms 20, 21. The push rod 28 at its end remote from pillar 19 is acted upon by a piston element 29 which is subjected to the fluid pressure which is generated in the engine torquemeter (shown generally at 93 in Figures 4 and 4A) and is a function of the engine torque.

The piston element 29 extends through a wall 30 separating the space 23 from a chamber 31 and is loaded by springs 32 to oppose the load on piston element 29 due to the torquemeter pressure which is communicated to chamber 31 through pipe 33. An adjustable abutment 34 may be provided for the springs 32 and the abutment 34 may be arranged to be adjusted in accordance with the engine rotational speed, for example, to increase the spring load as the speed increases.

A valve 35 may be provided in the pressure oil supply pipe 36 and the valve 35 may be connected through cranked lever 37 and rod 38 for operation by a constant speed unit of the engine and arranged only to open when a predetermined engine rotational speed is reached.

The valve 35 is shown in the partly open position, and the position of the lever 37 which corresponds to the fully open position of the valve 35 is shown in dotted lines. The rod 38 may be connected at its other end either to the speed selecting linkage of the constant speed unit of the engine (in a manner similar to that shown for parts 84—91 in Figure 4), in which case the valve 35 is arranged to open at a predetermined selected speed, or may be connected to the speed-sensitive mechanism of the constant speed unit, in which case the valve is arranged to open at a predetermined actual speed.

In operation, when the pressure oil supply valve 35 is opened on the attainment of the predetermined engine rotational speed, pressure oil is supplied directly to the side of the servo piston 11 nearer the valve member 10a and is supplied to the other side of piston 11 through flow restrictor 13. If the bleed valve 16 is closed, the fluid pressures on each side of the piston 11 will be equal and the metering valve 10a will be urged by the spring 17 in the direction to reduce the supply of additional fluid through pipes 9a, 9b to the engine. Opening of the bleed valve 16 causes a reduction in the pressure on the side of the piston 11 remote from the valve member 10a and causes the metering valve to be moved in the opening direction, thereby permitting an increase in the supply of additional fluid to the engine.

On increase of the torque delivered by the engine the torquemeter pressure increases causing the piston element 29 to displace the pillar 19 in a direction tending to close the bleed valve 16. Thus, as the engine torque increases towards a value predetermined by the setting of the spring abutment 34, the bleed valve 16 gradually closes reducing the difference in the pressures acting on piston 11 and causing the piston 11 to move to the right as viewed in the drawings due to the difference in the effective areas of the sides of the piston and due to the spring 17, thus tending to close the metering valve 10 and reducing the supply of additional fluid to the engine. Conversely, as the engine torque decreases the bleed valve 16 will be opened reducing the pressure on the left-hand side of the piston (as viewed in the drawings) so that the piston 11 moves to the left opening the metering valve 10 and causing an increase in the supply of additional fluid.

An increase in the quantity of additional fluid delivered to the engine will cause an increase in the engine output, and thus a stabilized condition will be reached in which the amount of additional fluid delivered will be that required to maintain the selected value of the torque. This amount will be a function of the difference between the torque which would be obtained in the unboosted condition and the selected torque.

In arrangements in which the spring abutment 34 is adjusted in accordance with engine rotational speed, it will normally be arranged that the load of spring 32 tending to close the bleed valve 16 is reduced as the engine rotational speed increases whereby the torquemeter pressure required to close the bleed valve increases as the engine rotational speed increases, so that the selected value of the torque which is maintained by the supply of additional fluid to the engine also increases as the engine rotational speed increases. This may be done by making the abutment 34 as a cam mounted on a shaft rotatable by means of a lever connected by a link to the pilot's speed control lever. A cam arrangement such as this is shown in and described with reference to Figure 5.

The spring abutment 34 may alternatively be arranged to be loaded by the speed-selecting lever which is used to select the engine rotational speed. In this arrangement the selected value of the torque which is maintained by the supply of additional fluid to the engine increases as the speed selected by the setting of the speed-selecting lever increases.

The bleed valve 16 is also loaded through diaphragms 20, 21 in accordance with absolute atmospheric pressure and the load applied to the pillar 19 and thus to the bleed valve is proportional to the absolute atmospheric pressure and tends to open the bleed valve 16. Thus on increase of atmospheric pressure, the supply of additional fluid will be increased, and on decrease of the atmospheric pressure the additional fluid will be decreased.

The metering valve 10 may also be provided with means whereby, when the valve member 10a is moved to its fullest extent in a direction to reduce the effective area of the metering orifice 10b, the supply of additional fluid to the metering valve orifice 10b is cut off by a shut-off-valve member 10c coming in contact with a co-operating valve seat 10d.

In the embodiment illustrated in Figure 2, the metering valve 10 is similarly arranged to be operated by piston 11 as described with reference to Figure 1. In this arrangement however, the space 12b is open to atmosphere, and the space 12a is connected through pipe 40 to a fluid pressure source.

The pressure fluid is supplied to the space 12a by way of a doubled-ended shuttle valve 41 which is so formed and arranged that, when the shuttle valve 41 is in one extreme position (the position illustrated), the pressure fluid supply is cut-off and the space 12a is placed in communication with a chamber 42 which is connected through a drain pipe 43 to a region of atmospheric pressure, and that, when the shuttle valve 41 is in its other extreme position, the connection between pipe 40 and the drain 43 is closed-off and the space 12a placed in communication with the pressure servo fluid supply pipe 44.

The shuttle valve 41 is arranged to be loaded by a lever 45 which is pivoted in a casing 46 at its end remote from the shuttle valve 41. The lever 45 is loaded through a push rod 47 by a piston 48 subjected to the torquemeter pressure by the chamber 49 of which the piston forms a wall being connected to the torquemeter pressure region through pipe 50, and the load is applied so that increase of the torquemeter pressure causes the shuttle valve 41 to move in the direction to cut-off the pressure fluid supply from space 12a. The lever is also loaded in the opposite sense by a spring 51. A pair of expansible capsules 52, 53 are provided and the capsules are interconnected by a tie-rod 54 arranged to abut by a lateral peg 55 on the lever 45 on the side thereof remote from the spring 51. Capsule 52 is connected internally to atmospheric pressure through conduit 56 and a capsule 53 is evacuated; thus on decrease of atmospheric pressure, a load is applied to the lever in opposition to the load of spring 51. Due to the arrangement of the capsules 52, 53, the load applied by them is proportional to the absolute atmospheric pressure.

In operation, on increase of the engine torque, the torquemeter pressure increases as described below with reference to Figure 4A and the lever 45 is loaded in a manner tending to move the shuttle valve 41 to cut-off the pressure servo fluid supply from the space 12a; the pressure acting on piston 11 is thereby reduced and the piston 11 is moved under the influence of spring 17 to displace valve member 10a to reduce the effective area of the metering orifice 10b and thereby to reduce the supply of additional fluid to the engine. Conversely, on decrease of engine torque the supply of additional fluid is increased. On decrease of atmospheric pressure, the lever 45 is loaded in the sense to reduce or cut-off the pressure fluid supply to space 12a, whereby the supply of additional fluid to the engine is decreased, and on increase of atmospheric pressure the additional fluid supply is increased.

In the embodiment illustrated in Figure 3, the metering valve 10 for the additional fluid again consists of a valve member 10a and a co-operating orifice 10b, whereof the valve member 10a is connected for operation to a piston 11 acting in a cylinder 12. It is arranged that the cylinder space 12b is directly connected through conduit 60 to a fluid pressure supply, and that the cylinder space 12a is connected to conduit 60 by way of conduit 61 having in it restricting orifice 62. The piston 11 is loaded by a spring 63 in the sense of moving valve member 10a to increase the area of the metering orifice 10b.

The space 12a is also connected to a bleed valve 64 which is arranged to control the flow of fluid from this space. The obturating member of the bleed valve 64 is in the form of a half ball carried on one end of a lever 65 which is pivoted by its other end to a casing 66. The casing 66 is formed with a cylinder space 67 containing a piston 68, and the side of the piston 68 remote from the lever is connected to be subjected to the torquemeter fluid pressure. A push rod 69 is interposed between the piston 68 and the lever 65 so that on increase of the torquemeter pressure the lever 65 is loaded in the sense of opening the bleed valve 64.

The lever 65 is also loaded by a spring 70, in the sense of closing the bleed valve 64. The casing 66 also contains an arrangement of interconnected capsules 52, 53 (similar to that of Figure 2) which abut on the lever 65 through peg 55 on the same side of the lever 65 as the push rod 69. The capsule arrangement is such that the load applied to the lever 65 through the peg 55 is in opposition to the load applied by the spring 70 and is inversely proportional to the absolute atmospheric pressure. Thus the lever 65 is loaded by the capsules in the sense of opening the bleed valve 64 on decrease of atmospheric pressure, and the load is reduced on increase of atmospheric pressure.

In operation, on increase of the engine torque, the torquemeter pressure increases as described below with reference to Figure 4A and the lever 65 is loaded in the sense of opening the bleed valve 64, so that the servo pressure in the space 12a is reduced, and the metering valve member 10a is therefore moved in a direction to reduce the supply of additional fluid to the engine. On decrease of the torquemeter pressure, the bleed valve 64 tends to close, whereby the pressures on either side of the metering valve piston tend to equalise and the valve member 10a is moved by the spring 63 in a direction to increase the effective area of the orifice 10b, thereby increasing the supply of additional fluid to the engine.

On decrease of atmospheric pressure, the bleed valve 64 is opened and the metering valve member 10a is therefore moved in a manner to reduce the supply of additional fluid to the engine, and on increase of atmospheric pressure the bleed valve 64 is loaded in the sense of closure by spring 70 and the metering valve member 10a is moved to increase the supply of additional fluid to the engine.

A by-pass valve 71 may be provided to connect the conduit 61a (leading from space 12a to the bleed valve 64) to conduit 72 leading to the interior of casing 66. The valve 71 is arranged to be closed on selection or attainment of a preselected engine rotational speed. For instance, as shown, the valve 71 may be loaded towards the open position by a spring 74 which urges the spindle of the valve 71 against a cam 75 by means of which the valve can be closed. The cam 75 is mounted on a shaft 76 having a radius arm 77 connected by a link 78 to the pilot's speed control lever. In this way the cam will be rotated on adjustment of the pilot's control lever either to close the valve 71 or to allow it to open under the action of the spring 74.

When the by-pass valve 71 is open the bleed valve 64 is by-passed and pressure fluid from space 12a is allowed to flow away through conduit 72, casing 66, and conduit 73, for example to a storage tank. Thus when valve 71 is open, the metering valve piston 11 is urged by the fluid pressure acting on it to move in a direction to reduce the effective area of the metering valve orifice 10b.

When the by-pass valve is closed the bleed valve 64 becomes operative and the supply of additional fluid is controlled in accordance with the engine torque.

Referring now to Figures 4 and 5, there is illustrated an application of the invention to the control of a supply of a water/methanol mixture to the inlet of a gas-turbine engine.

The engine is only diagrammatically illustrated in simple form and may be of any convenient kind. The engine is indicated as having a compressor 80, combustion equipment 81 receiving compressed air from the compressor and fuel to be burnt in the air from a main fuel supply system including fuel injectors 81a fed with fuel under pressure from a manifold 81b, and a turbine arrangement 82 which drives the compressor 80 through driving shaft 82a and may, as shown, also drive power-absorbing means such as an airscrew 83 through an extension 82b of the driving shaft, reduction gear 79, and airscrew shaft 83a.

The airscrew 83 is, as is normal in modern practice, shown as having a constant speed unit having setting means (indicated by lever 84) capable of being set to select the rotational speed of the airscrew 83 (and thus of the engine) at which it is to be governed. The constant speed unit is usually set by a pilot's speed control lever 85 which may, as shown in this case, also control the engine fuel supply; the lever 85 is shown as being connected by link 87, lever 88, shaft 89, lever 90 and link 91 to setting lever 84 of the constant speed unit, and a link 92 is indicated to lead to a fuel control (not shown).

It is known to provide a torquemeter in the drive between an airscrew and its driving means, in which torquemeter an oil pressure is generated which is a function of the torque developed by the engine.

Such a torquemeter indicated generally at 93 and also shown in Figure 4A is illustrated, purely for the sake of example, as comprising a piston 93a in a cylinder 93b, pressure fluid being supplied to the cylinder space by a pump 93c from a suitable reservoir (not shown).

The cylinder 93b is supported by the fixed casing of the engine, and the piston 93a is connected to a member to which the torque reaction is transmitted, shown as the annular gear member 79a of an epicyclic reduction gear 79, of which the sun wheel 79b is connected to the engine shaft 82b and the planet carrier 79c is connected to the airscrew shaft 83a. An edge of the piston 93a co-operates with an outlet port 93d which forms the return connection to the pressure fluid reservoir, and the device operates in well-known manner, the piston 93a moving on increase of torque to restrict the outlet port 93d, thereby increasing the pressure in the cylinder space to balance the force exerted on the piston, and moving on decrease of torque to lessen the restriction of the outlet port 93d. In this way the pressure in the cylinder is maintained proportional to the engine torque.

Any other convenient type of torquemeter may be used, in which a fluid pressure is developed which is a function of the engine torque.

The engine is also shown in Figure 4 as being fitted with means to supply a water/methanol mixture to the engine, and the supply is controlled in accordance with the torque developed by an arrangement of this invention, which includes a torque-responsive element. The pressure oil from the torquemeter is conveniently employed as the medium to which the torque-responsive element is subjected.

The water/methanol is drawn from a tank 94 by a pump 95 and is delivered through pipe 97 past a shut-off cock 96 to a metering valve 10 and from the metering valve 10 through pipe 98 to the engine.

As in the constructions previously described with reference to Figures 1–3 the metering valve comprises a valve member 10a co-operating with an orifice 10b to determine its area, and the valve member 10a is adjusted by a servo piston 11 which divides a cylinder 12 into two spaces 12a, 12b the space 12b accommodating a piston-loading spring 17.

Pressure fluid is supplied through pipe 40 to the cylinder space 12a in a manner similar to that described in respect of Figure 2 although the shuttle valve 41 is controlled not by a lever, such as lever 45, but by a control arrangement similar to that of Figure 1.

The shuttle valve 41 in Figure 5 controls simultaneously the flow of fluid through two ports 100, 101 of which port 100 leads to a conduit 102 connected to a suitable source of pressure fluid, say the engine high-pressure oil pump (not shown), and port 101 leads to a chamber 103 in a casing 104, which chamber 103 is connected by a conduit 105 to the engine oil tank (not shown) which is substantially at atmospheric pressure. The chamber 12b is also connected to conduit 105. It will be clear that as the shuttle valve 41 moves to cut off the flow through port 100 and open port 101, so the pressure acting in cylinder space 12a falls and the piston 11 moves valve member 10a to cut down the effective area of orifice 10b, and that as the shuttle valve 41 moves to cut off the flow through port 101 the fluid pressure acting in cylinder space 12a increases moving piston 11 to open the metering valve 10.

The casing 104 is formed with two side chambers 106, 107, of which chamber 106 is separated from chamber 103 by a flexible diaphragm 108 and is evacuated, and of which chamber 107 is separated from chamber 103 by a flexible diaphragm 109 and is connected through conduit 110 to atmosphere.

The diaphragms 108, 109 are of equal area and face one another, and they are interconnected by a pillar 111. The pillar 111 is located parallel to the shuttle valve 41 and its movements are communicated to the shuttle valve 41 by a lateral arm 111a having at its end a tappet 112 to bear on a projection 41a from the shuttle valve. The pressure drop from the conduit 102 to the chamber 103 causes a load on the shuttle valve 41 sufficient to hold it against the tappet 112.

The movements of the pillar 111 are due to the loads applied to it.

(a) By the diaphragms 108, 109, which apply a load dependent on absolute atmospheric pressure, (b) By a push rod 113, which applies a load dependent on the fluid pressure generated in the torquemeter, and (c) By a push rod 114, which applies a spring load which can be adjusted.

The push rod 113 engages by one end in a notch in the pillar 111 and bears by its other end against a piston element 115 one end of which is in chamber 103 and the other end of which is in a side chamber 116 which is connected by conduit 117 to the point in the torquemeter 93 at which the pressure proportional to the engine torque is generated. The piston element 115 is thus loaded in accordance with engine torque and is also loaded by a light spring 118 having an adjustable abutment 119. The movement of the piston element 115 is limited by stop means 120 engaging a groove in the piston element 115. With the arrangement shown as the torquemeter pressure in chamber 116 increases, the shuttle valve 41 is moved to open port 101 and thus decrease the supply of additional fluid.

The push rod 114 bears by one end in a notch in the pillar 111 and bears by its other end in a cup abutment member 121 for one end of a main loading spring 122 the opposite end of which abuts casing 104.

The abutment member 121 also has bearing on it a trimmer spring 123 which opposes the effect of the main spring 122 on push rod 114. The trimmer spring 123 has as its second abutment the end of a lever 124 which is rocked by a cam 125 carried on a shaft 126. The shaft 126 is rotated by a radius arm 127 connected by a link 128 with a radius arm 129 extending from shaft 89 so that the shaft 126 is rotated and lever 124 is rocked under control of the pilot's speed control lever 85. The effective resultant load of springs 122, 123 opposes the effective load of piston element 115 so that an increase in the resultant spring load increases the supply of additional fluid, and thus an increase in the load of spring 123 tends to decrease the supply of additional fluid. The cam 125 is shaped to decrease the load of trimmer spring 123, and thus to increase the supply of additional fluid, as the selected engine rotational speed increases. Thus as the selected speed increases, the load applied to pillar 111 through push rod 114 increases and the value at which the torque is maintained also increases.

The shaft 126 also operates a shut-off valve 130 in the pressure oil supply line 102 and the valve 130 is arranged to be opened when the control lever 85 (and thus the constant speed unit datum control lever 84) have been moved to select an engine rotational speed above a given value.

The control just described therefore operates at engine rotational speeds above the given value to maintain the torque delivered by the engine at a value which is unique for each rotational speed, and therefore the control operates at each rotational speed above the given value to maintain a corresponding value of the horse-power delivered by the engine. Furthermore, the torque or horsepower at which the engine is controlled to operate by the injection of the additional fluid, is varied in accordance with atmospheric pressure; thus as the atmospheric pressure increases the shuttle valve 41 is displaced to increase the supply of additional fluid and on decrease of atmospheric pressure, the supply of additional fluid is decreased.

We claim:

1. In or for an engine having fuel injection means and arranged for additional fluid injection, a control system comprising means to vary the delivery of additional fluid and torque-responsive means to respond to engine torque and arranged to control said means to vary the delivery of the additional fluid to the engine in accordance with the engine torque, and means responsive to a rotational speed condition of the engine and arranged to render said torque-responsive means operative to control the supply of additional fluid on increase of the engine rotational speed above a selected engine rotational speed.

2. In or for an engine having fuel injection means and arranged for additional fluid injection, a control system comprising means to vary the delivery of additional fluid, and torque-responsive means arranged to respond to engine torque and arranged to control said means to vary the delivery of the additional fluid to the engine to increase the supply of additional fluid as the engine torque decreases and to decrease the supply of additional fluid as the engine torque increases, whereby the additional fluid flow is governed to maintain a selected engine torque, said torque-responsive means being arranged also to respond to a rotational speed condition of the engine to increase the maintained value of torque on increase of the value of said rotational speed condition.

3. A control system as claimed in claim 2, wherein said torque-responsive means is arranged to respond to actual engine rotational speed.

4. A control system as claimed in claim 2, comprising also an engine-speed-selecting device and means interconnecting said engine-speed-selecting device and said torque-responsive means whereby said rotational speed condition is selected engine rotational speed.

5. In or for an engine having fuel injection means and arranged for additional fluid injection, a control system comprising means to vary the delivery of additional fluid, and torque-responsive means arranged to respond to engine torque and also to respond to a rotational speed condition of the engine and connected to control said means to vary the delivery of the additional fluid to the engine to increase the supply of additional fluid as the engine torque decreases and to decrease the supply of additional fluid as the engine torque increases to maintain the engine torque at a value which decreases on increase of the value of said rotational speed condition and increases on decrease of said rotational speed condition in a manner to maintain constant the power developed by the engine.

6. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of additional fluid to the engine, said means being separate from the main fuel supply system and comprising a control system including means to vary the delivery of said additional fluid and torque-responsive means arranged to respond to the torque in said power output shaft and connected to control said delivery-varying means to increase the supply of additional fluid as the engine torque decreases and to decrease the supply of additional fluid as the engine torque increases.

7. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of additional fluid to the engine, said means being separate from the main fuel supply system and comprising a control system including means to vary the delivery of said additional fluid and torque-responsive means arranged to respond to a selected value of the torque in said power output shaft and connected to control said delivery-varying means to increase the supply of additional fluid as the engine torque decreases from said selected value thereof and to decrease the supply of additional fluid as the engine torque increases from said selected value, whereby the flow of additional fluid is governed to maintain the torque at said selected value.

8. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of additional fluid to the engine, said means being separate from the main fuel supply system and comprising a control system including torquemeter means of the kind in which there is generated a fluid pressure which is a function of the torque delivered by said engine and connected to be actuated by said power output shaft, a conduit connected to convey said additional fluid to the engine, a metering valve in said conduit, and a pressure-sensitive device connected to be sensitive to said torquemeter pressure and connected to said metering valve to adjust the supply of additional fluid in dependence on the torque.

9. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of additional fluid to the engine, said means being separate from the main fuel supply system and comprising a control system including torquemeter means of the kind in which there is generated a fluid pressure which is a function of the torque delivered by said engine and connected to be actuated by said power output shaft, a conduit to convey said additional fluid to the engine, valve means in said conduit, a servo mechanism including a piston and cylinder device whereof the piston co-operates with the cylinder to form a pressure space, and whereof the piston is operatively connected to said valve means, a source of servo fluid under pressure, a point at lower pressure, control means to connect said pressure space alternatively to said pressure source and to said point at lower pressure, and a pressure-sensitive device connected to be sensitive to the torquemeter fluid pressure and to operate said control means, thereby to control said valve means so that the supply of additional fluid to the engine is dependent on said torque.

10. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of water methanol to the engine, said means being separate from the main fuel supply system and comprising a control system including means to vary the delivery of said water methanol and torque-responsive means arranged to respond to the torque in said power output shaft and connected to control said delivery-varying means in accordance with said torque.

11. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of water methanol to the engine, said means being separate from the main fuel supply system and comprising a control system including means to vary the delivery of said water methanol and torque-responsive means arranged to respond to the torque in said power output shaft and connected to control said delivery-varying means to increase the supply of water methanol as the engine torque decreases and to decrease the supply of water methanol as the engine torque increases.

12. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of water methanol to the engine, said means being separate from the main fuel supply system and comprising a control system including torquemeter means of the kind in which there is generated a fluid pressure which is a function of the torque delivered by said engine and connected to be actuated by said power output shaft, a conduit connected to convey said water methanol to the engine, a metering valve in said conduit, and a pressure-sensitive device connected to be sensitive to said torquemeter pressure and connected to said metering valve to adjust the supply of water methanol in dependence on the torque.

13. In or for a gas-turbine engine having a compressor, combustion equipment receiving compressed air from the compressor, a turbine which is connected to receive combustion products from the combustion equipment and is connected to drive the compressor, a power output shaft, and a main fuel supply system to supply fuel to said combustion equipment; means for delivering a supply of water methanol to the engine, said means being separate from the main fuel supply system and comprising a control system including torquemeter means of the kind in which there is generated a fluid pressure which is a function of the torque delivered by said engine and connected to be actuated by said power output shaft, a conduit to convey said water methanol to the engine, valve means in said conduit, a servo mechanism including a piston and cylinder device whereof the piston co-operates with the cylinder to form a pressure space, and whereof the piston is operatively connected to said valve means, a source of servo fluid under pressure, a point at lower pressure, control means to connect said pressure space alternatively to said pressure source and to said point at lower pressure, and a pressure-sensitive device connected to be sensitive to the torquemeter fluid pressure and to operate said control means, thereby to control said valve means so that the supply of water methanol to the engine is dependent on said torque.

14. In or for a combustion engine having fuel combustion means, a main fuel supply system to supply fuel to said combustion means, and a power output shaft driven by the engine; means for delivering a supply of non-fuel fluid to the engine, said means being separate from the main fuel supply system and comprising a control system including means to vary the delivery of said non-fuel fluid and torque-responsive means arranged to respond to the torque in said power output shaft and connected to control said delivery-varying means in accordance with said torque, so that an increase in torque results in a decrease of the non-fuel fluid supply and a decrease in torque results in an increase in the non-fuel fluid supply.

15. For an internal combustion engine having a power output shaft, means to supply fuel to be burnt in the engine, and means to supply an additional fluid to the engine for power augmentation purposes; a control system for controlling said means to supply additional fluid comprising torquemeter means of the kind in which there is generated a fluid pressure which is a function of the torque delivered by said engine and connected to be actuated by said power output shaft; a conduit to convey said additional fluid; valve means in said conduit; servo mechanism including a piston and cylinder device whereof the piston divides the cylinder into two pressure spaces and whereof the piston is operatively connected to said valve means; flow-restricting means interconnecting the cylinder spaces on each side of said piston; a source of servo fluid pressure; a connection from said source of servo fluid pressure to the cylinder space on one side of said flow-restricting means; a spring arranged within the other cylinder space to load the piston against the pressure of the servo fluid; a bleed connection from the other side of said flow-restricting means; a bleed control valve arranged to control the bleed flow through said bleed connection, and a pressure-sensitive device connected to be sensitive to said torquemeter pressure and to actuate said bleed control valve.

16. A control system as claimed in claim 15 wherein said pressure-sensitive device comprises a lever arranged to be loaded by a load dependent upon the fluid pressure generated in the torquemeter and arranged to operate said bleed valve.

17. A control system as claimed in claim 16, wherein said lever is also arranged to be loaded by means sensitive to an ambient atmospheric pressure in a sense to increase the supply of additional fluid on increase of atmospheric pressure and vice versa.

18. A control system as claimed in claim 15 wherein said pressure-sensitive device comprises a pillar member supported for movement longitudinally of itself and arranged by its movement to actuate said bleed valve, a piston arranged to be loaded against the action of a spring load by said fluid pressure generated in said torquemeter, and a push rod engaging said piston by one end and said pillar by its opposite end to transmit movements of said piston to said pillar.

19. For an internal combustion engine having a power output shaft, means to supply fuel to be burnt in the engine, and means to supply an additional fluid to the engine for power augmentation purposes; a control system for controlling said means to supply additional fluid comprising torquemeter means of the kind in which there is generated a fluid pressure which is a function of the torque delivered by said engine and connected to said power output shaft to be actuated thereby; a conduit to convey said additional fluid; valve means in said conduit; servo mechanism including a piston and cylinder device whereof the piston divides the cylinder into two pressure spaces and whereof the piston is operatively connected to said valve means; a source of servo fluid pressure; a servo fluid supply chamber having an inlet thereto connected to said source; a drain outlet from said chamber; a connection from said chamber to the pressure space on one side of said piston; a spring arranged within the other cylinder space to load the piston against the pressure of the servo fluid; a shuttle valve member arranged to cooperate with said inlet and said outlet so as on movement to increase the effective area of one and to decrease the effective area of the other; and a pressure-sensitive device connected to be sensitive to said torquemeter fluid pressure and to operate said shuttle valve.

20. A control system as claimed in claim 19 wherein said pressure-sensitive device comprises a lever arranged to be loaded by a load dependent upon the fluid pressure generated in the torquemeter and arranged to operate said shuttle valve.

21. A control system as claimed in claim 20, wherein said lever is also arranged to be loaded by means sensitive to an ambient atmospheric pressure in a sense to increase the supply of additional fluid on increase of atmospheric pressure and vice versa.

22. A control system as claimed in claim 19 wherein said pressure-sensitive device comprises a pillar member supported for movement longitudinally of itself and arranged by its movement to actuate the shuttle valve, a piston arranged to be loaded against the action of a spring load by said fluid pressure generated in said torquemeter, and a push rod engaging said piston by one end and said pillar by its opposite end to transmit movements of said piston to said pillar.

23. A control system as claimed in claim 22, wherein said pillar is supported at its ends by flexible diaphragms.

24. A control system as claimed in claim 23, wherein one of said diaphragms affords a wall of an evacuated chamber and the other of said diaphragms affords a wall of a chamber wherein the pressure is an atmospheric pressure, whereby said pillar is also displaced longitudinally of itself in dependance upon said atmospheric pressure in a sense to increase the supply of additional fluid on increase of atmospheric pressure and decrease the supply of additional fluid on decrease of atmospheric pressure.

25. A control system as claimed in claim 24 comprising also means to adjust the spring load against which the torquemeter-fluid-pressure operates.

26. A control system as claimed in claim 25, wherein said means to adjust the spring load is arranged to be adjustable in accordance with a rotational speed condition of the engine to adjust the spring load in accordance with the rotational speed condition.

27. A control system as claimed in claim 25 wherein said means to adjust the spring load is arranged to be adjustable in accordance with engine rotational speed to increase the spring load in accordance with the engine rotational speed.

28. A control system as claimed in claim 25, which comprises also an engine-speed-selecting device and wherein said means to adjust the spring load is arranged to be adjustable in accordance with the setting of the engine-speed-selecting device to increase the spring load in accordance with the engine rotational speed selected by said speed-selecting device.

29. A control system as claimed in claim 22 wherein said push rod extends from said piston to said pillar at an angle inclined to the longitudinal axis of the pillar and the spring load against which the piston is displaced by the torquemeter-fluid-pressure is applied to the pillar by a second push rod which is aligned with said first push rod and bears by one end on the pillar on the opposite side to the first push rod and bears by its opposite end against a movable abutment for a loading spring.

30. A control system as claimed in claim 29, wherein said spring comprises a main spring and a trimmer spring to vary the load due to said main spring, and an adjustable abutment for said trimmer spring which adjustable abutment is displaced in accordance with a rotational speed condition of the engine.

31. A control system as claimed in claim 30, wherein the adjustable abutment for said trimmer spring comprises a lever and a cam for rocking said lever which cam is arranged for rotation by an engine-speed-selecting device, whereby the adjustable abutment is displaced in accordance with engine selected rotational speed.

32. A control system as claimed in claim 30, arranged to become operative at a selected actual engine rotational speed.

33. A control system as claimed in claim 32, comprising also valve means controlling the supply of pressure servo fluid to said servo mechanism and arranged to be opened on attainment of a selected actual engine rotational speed.

34. For an internal combustion engine having a power output shaft, means to supply fuel to be burnt in the engine, and means to supply an additional fluid to the engine for power augmentation purposes; a control system for controlling said means to supply additional fluid comprising torquemeter means of the kind in which there is generated a fluid pressure which is a function of the torque delivered by said engine and connected to said power output shaft to be actuated thereby; a conduit to convey said additional fluid; valve means in said conduit; servo mechanism including a piston and cylinder device whereof the piston divides the cylinder into two pressure spaces and whereof the piston is operatively connected to said valve means; a source of servo fluid pressure; a servo fluid supply chamber having an inlet thereto connected to said source; a drain outlet from said chamber; a connection from said chamber to the pressure space on one side of said piston; a spring arranged within the other cylinder space to load the piston against the pressure of the servo fluid; a shuttle valve member arranged to cooperate with said inlet and said outlet so as on movement to increase the effective area of one and to decrease the effective area of the other; and a pressure-sensitive device connected to be sensitive to said torquemeter fluid pressure and to operate said shuttle valve, and comprising a pillar member supported for movement longitudinally of itself and arranged by its movement to actuate the shuttle valve, a piston, means to apply a spring load to said piston, said piston being adapted to be loaded against the spring load by said fluid pressure generated in said torquemeter, a push rod engaging said piston by one end and said pillar by its opposite end to transmit movements of said piston to said pillar, and means adapted to adjust said spring load in accordance with a rotational speed condition of the engine to increase the spring load in accordance with increase of the rotational speed condition.

35. A control system as claimed in claim 34, wherein said means to adjust the spring load is adapted to increase the spring load on increase of actual rotational speed.

36. A control system as claimed in claim 34, wherein said means to adjust the spring load is adapted to increase the spring load on increase of the selected engine rotational speed.

References Cited in the file of this patent

UNITED STATES PATENTS

| | | |
|---|---|---|
| 2,078,956 | Lysholm | May 4, 1937 |
| 2,187,120 | Gosslau et al. | Jan. 16, 1940 |
| 2,262,022 | Lundquist et al. | Nov. 11, 1941 |
| 2,303,998 | Holley | Dec. 1, 1942 |
| 2,350,781 | Lichte | June 6, 1944 |
| 2,378,037 | Reggio | June 12, 1945 |
| 2,438,998 | Halford | Apr. 6, 1948 |
| 2,442,049 | Lee | May 25, 1948 |
| 2,445,337 | Robinson | July 20, 1948 |
| 2,530,139 | Wiegand | Nov. 14, 1950 |
| 2,524,444 | Ifield | Oct. 3, 1950 |
| 2,554,612 | Bills et al. | May 29, 1951 |
| 2,657,530 | Lee | Nov. 3, 1953 |